United States Patent
Ogawa et al.

[11] Patent Number: 5,134,847
[45] Date of Patent: Aug. 4, 1992

[54] DOUBLE AIR-FUEL RATIO SENSOR SYSTEM IN INTERNAL COMBUSTION ENGINE

[75] Inventors: Takashi Ogawa; Kazuhiko Funato, both of Toyota, Japan

[73] Assignee: Toyota Jidosha Kabushiki Kaisha, Japan

[21] Appl. No.: 677,468

[22] Filed: Mar. 29, 1991

[30] Foreign Application Priority Data

Apr. 2, 1990 [JP] Japan ............................... 2-87726

[51] Int. Cl.⁵ .............................................. F01N 3/20
[52] U.S. Cl. ....................................... 60/274; 60/276; 60/277
[58] Field of Search .......................... 60/277, 274, 276

[56] References Cited

U.S. PATENT DOCUMENTS

| | | |
|---|---|---|
| 3,962,866 | 6/1976 | Neidhard et al. |
| 4,007,589 | 2/1977 | Neidhard et al. |
| 4,177,787 | 12/1979 | Hattori ................................. 60/277 |
| 4,622,809 | 11/1986 | Abthoff et al. |
| 4,739,614 | 4/1988 | Katsuno et al. |
| 4,817,383 | 4/1989 | Masui ................................... 60/276 |

FOREIGN PATENT DOCUMENTS 2178857 2/1987 United Kingdom ................. 60/276

Primary Examiner—Douglas Hart
Attorney, Agent, or Firm—Oliff & Berridge

[57] ABSTRACT

In a double air-fuel ratio sensor system including two air-fuel ratio sensors upstream and downstream of a catalyst converter provided in an exhaust gas passage, the actual air fuel ratio is adjusted in accordance with the air-fuel ratio correction amount calculated by using the output of the upstream-side air-fuel ratio sensor and the output of the downstream-side air-fuel ratio sensor. In this system, a detection whether or not the catalyst converter is deteriorated is carried out by using the output of the downstream-side air-fuel ratio sensor when the feedback control condition is satisfied. This detecting operation is prohibited when the upstream-side air-fuel ratio sensor is in an abnormal state.

12 Claims, 16 Drawing Sheets

BEFORE DETERIORATION

AFTER DETERIORATION

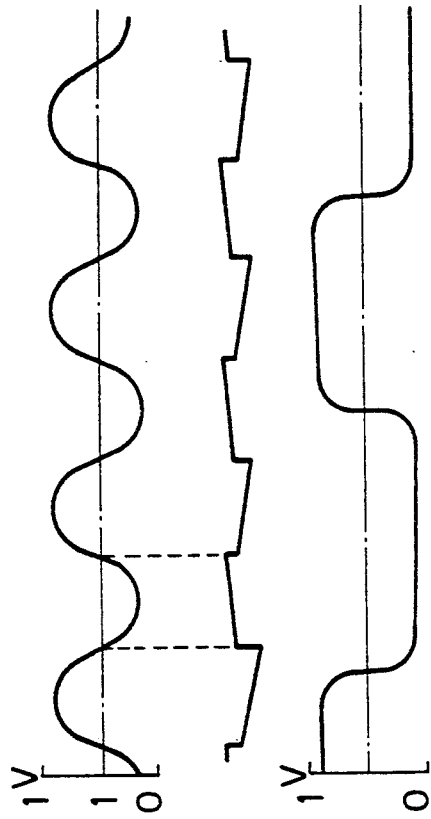
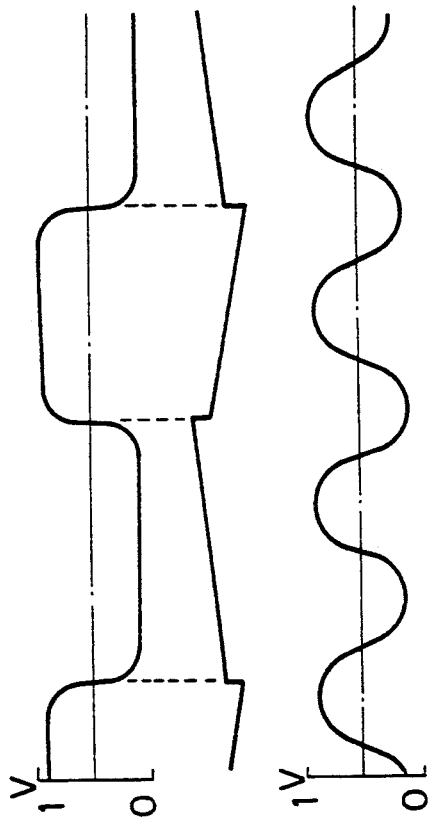
Fig. 2A
Fig. 2B
Fig. 2C
Fig. 3A
Fig. 3B
Fig. 3C

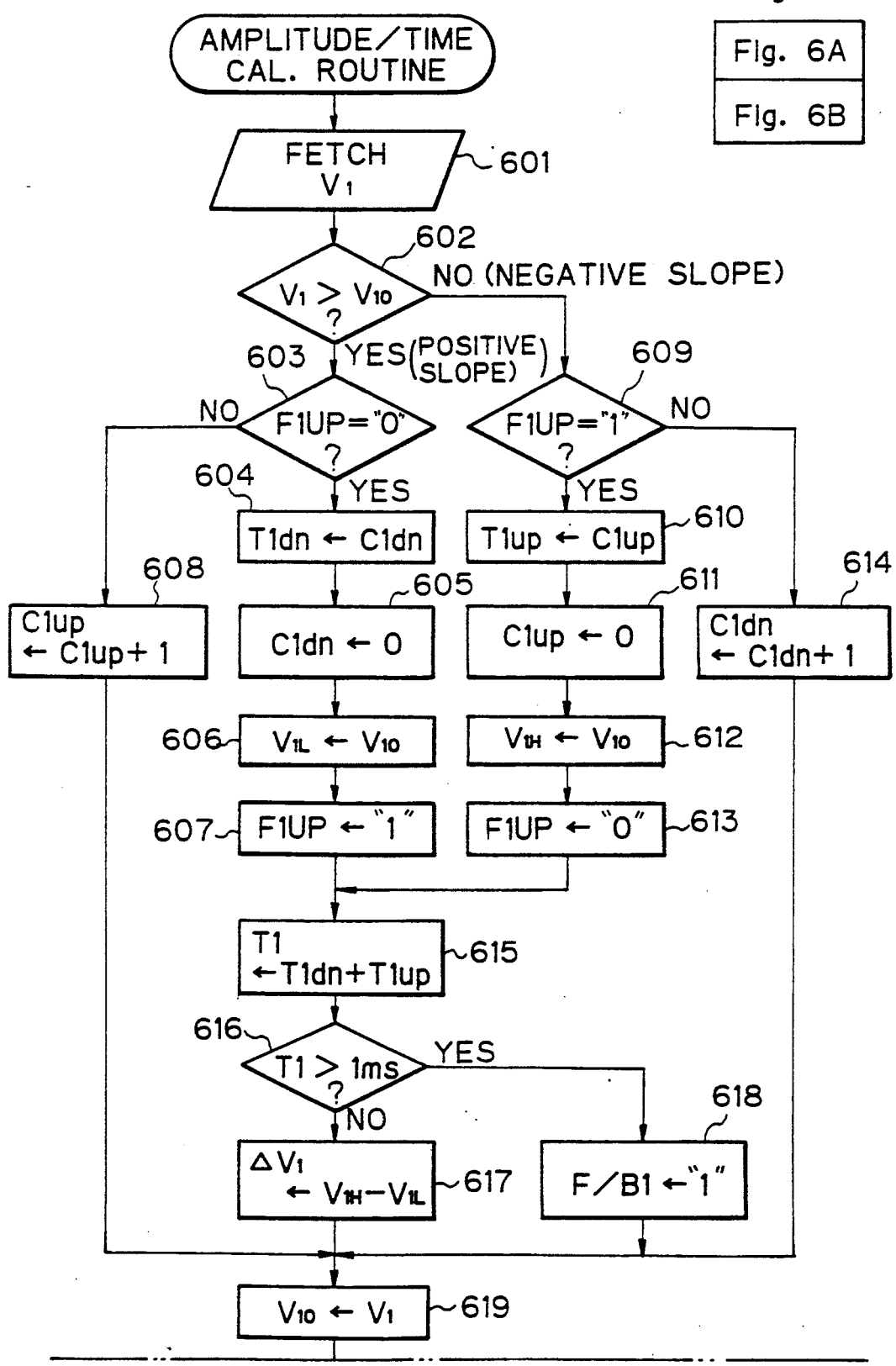

Fig. 9A
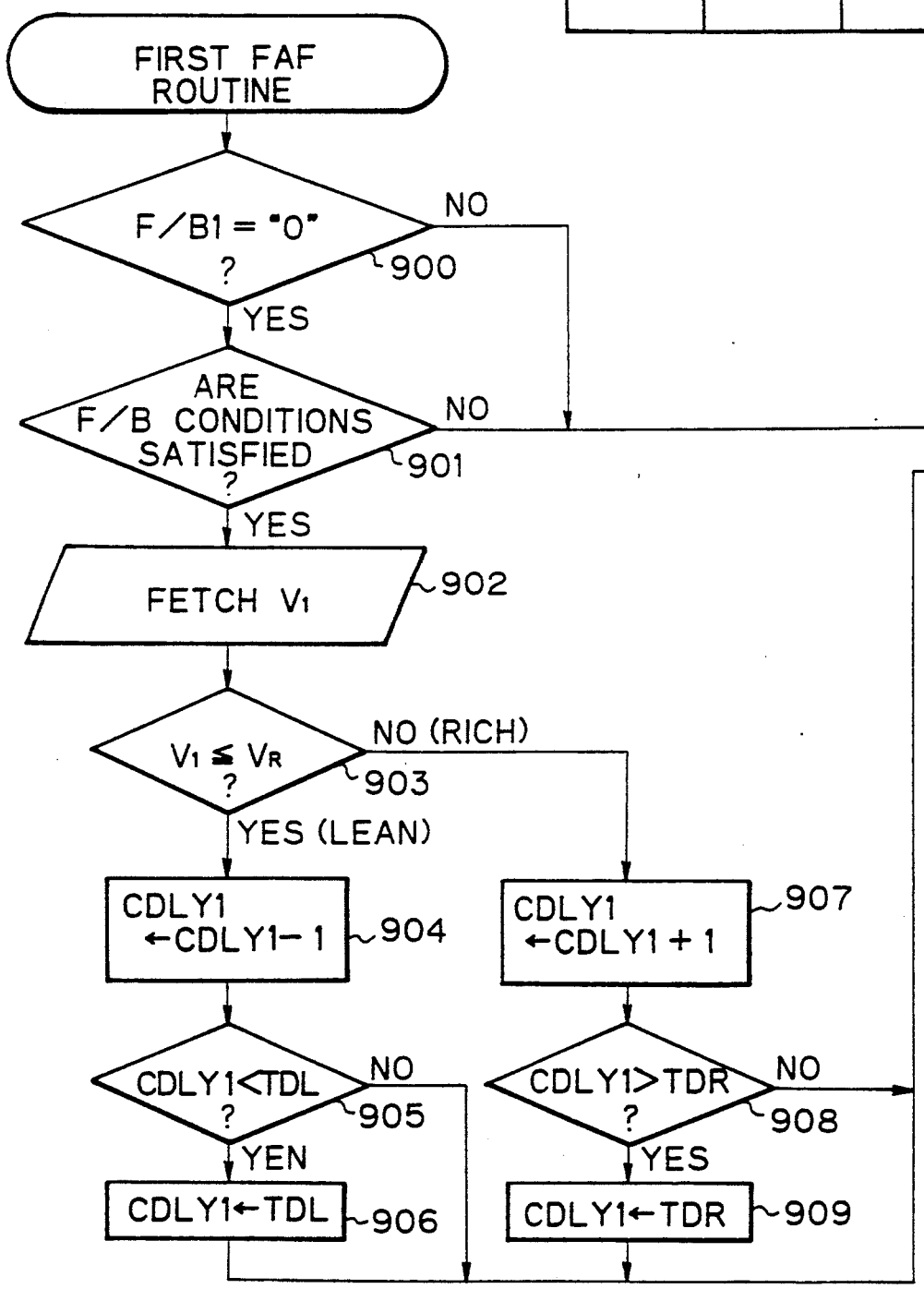
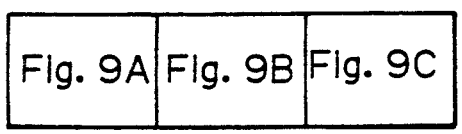

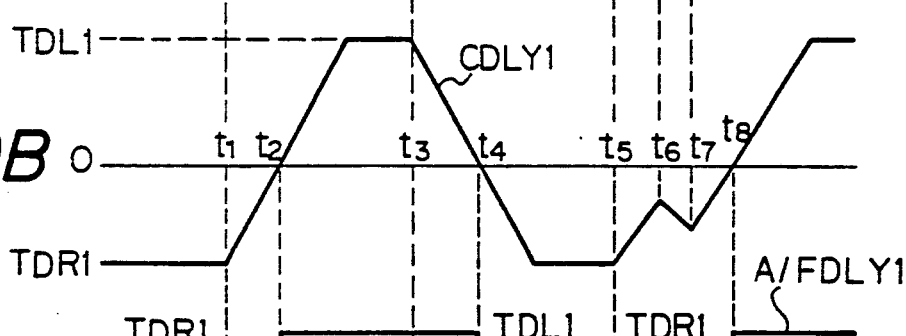
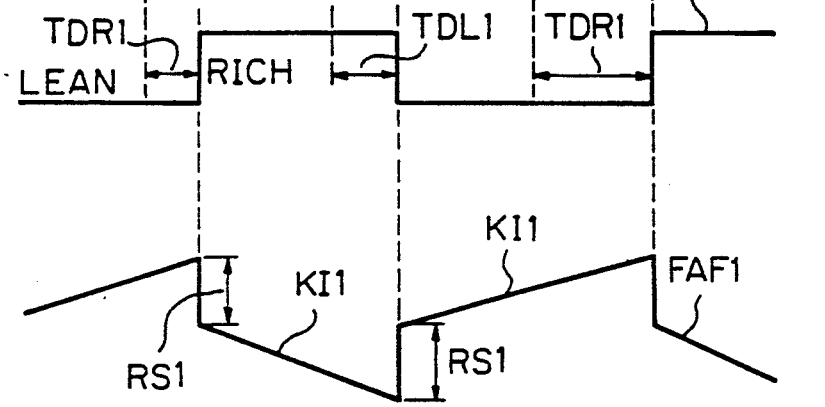
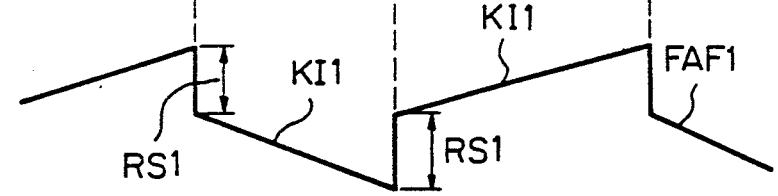

DOUBLE AIR-FUEL RATIO SENSOR SYSTEM IN INTERNAL COMBUSTION ENGINE

BACKGROUND OF THE INVENTION

1) Field of the Invention

The present invention relates to a method and apparatus for detecting a deterioration of a catalyst converter disposed within an exhaust gas passage of an internal combustion engine having two air-fuel ratio sensors upstream and downstream of the catalyst converter.

2) Description of the Related Art

Generally, in a feedback control of the air-fuel ratio in a single air-fuel ratio sensor ($O_2$ sensor) system, a base fuel amount TAUP is calculated in accordance with the detected intake air amount and detected engine speed, and the base fuel amount TAUP is corrected by an air-fuel ratio correction coefficient FAF which is calculated in accordance with the output signal of an air-fuel ratio sensor (for example, an $O_2$ sensor) for detecting the concentration of a specific component such as the oxygen component in the exhaust gas. Thus, an actual fuel amount is controlled in accordance with the corrected fuel amount. The above-mentioned process is repeated so that the air-fuel ratio of the engine is brought close to a stoichiometric air-fuel ratio. According to this feedback control, the center of the controlled air-fuel ratio can be within a very small range of air-fuel ratio around the stoichiometric ratio required for three-way reducing an oxidizing catalysts (catalyst converter) which can remove three pollutants CO, HC, and NOx simultaneously from the exhaust gas.

In the above-mentioned $O_2$ sensor system where the $O_2$ sensor is disposed at a location near the concentration of an exhaust manifold, i.e., upstream of the catalyst converter, the accuracy of the controlled air-fuel ratio is affected by individual differences in the characteristics of the parts of the engine, such as the $O_2$ sensor, the fuel injection valves, the exhaust gas recirculation (EGR) valve, the valve lifters, individual changes due to the aging of these parts, environmental changes, and the like. That is, the characteristics of the $O_2$ sensor fluctuate, or if the uniformity of the exhaust gas fluctuates, the accuracy of the air-fuel ratio correction amount FAF is also fluctuated, thereby causing fluctuations in the controlled air-fuel ratio.

To compensate for the fluctuation of the controlled air-fuel ratio, double $O_2$ sensor systems have been suggested (see: U.S. Pat. Nos. 3,939,654, 4,027,477, 4,130,095, 4,235,304). In a double $O_2$ sensor system, another $O_2$ sensor is provided downstream of the catalyst converter, and thus an air-fuel ratio control operation is carried out by the downstream-side $O_2$ sensor in addition to an air-fuel ratio control operation carried out by the upstream-side $O_2$ sensor. In the double $O_2$ sensor system, although the output characteristic $V_2$ of the downstream-side $O_2$ sensor shown in FIG. 1B has a lower response speed when compared with the output characteristic $V_1$ of the upstream-side $O_2$ sensor shown in FIG. 1A, the downstream-side $O_2$ sensor has an advantage in that the output fluctuation characteristics are small when compared with those of the upstream-side $O_2$ sensor, for the following reasons:

(1) On the downstream side of the catalyst converter, the temperature of the exhaust gas is low, so that the downstream-side $O_2$ sensor is not affected by a high temperature exhaust gas.

(2) On the downstream side of the catalyst converter, although various kinds of pollutants are trapped in the catalyst converter, these pollutants have little affect on the downstream-side $O_2$ sensor.

(3) On the downstream side of the catalyst converter, the exhaust gas is mixed so that the concentration of oxygen in the exhaust gas is approximately in an equilibrium state.

Therefore, according to the double $O_2$ sensor system, the fluctuation of the output of the upstream-side $O_2$ sensor is compensated by a feedback control using the output of the downstream-side $O_2$ sensor.

In the above-mentioned double $O_2$ sensor system, however, when the catalyst converter is deteriorated, the downstream-side air-fuel ratio sensor may be affected by unburned gas such as HC, CO, and $H_2$, thereby also deteriorating the output characteristic $V_2$ thereof as shown in FIG. 1C. In this case, the controlled air-fuel ratio is fluctuated by a feedback control by the downstream-side air-fuel ratio sensor, thus also deteriorating the fuel consumption, the driveability, and the conditions of the exhaust emission characteristics for the HC, CO, and NOx components thereof.

Accordingly, a technique has been proposed of observing the deterioration of the catalyst converter when the amplitude of the output signal from the downstream-side $O_2$ sensor is larger than a predetermined value, the period of the output signal from the downstream-side $O_2$ sensor is smaller than a predetermined value, or a ratio of the period of the output of the upstream-side $O_2$ sensor to the period of the output of the downstream-side $O_2$ sensor is larger than a predetermined value.

In this technique, however, the catalyst converter can be judged as deteriorated even when the output characteristics of the upstream-side $O_2$ sensor are deteriorated, as shown in FIGS. 2A to 2C indicating the output of the upstream-side $O_2$ sensor, air-fuel ratio correction amount, and the output of the downstream-side $O_2$ sensor, respectively, when the upstream-side $O_2$ sensor is in a normal state, FIGS. 3A to 3C indicating the output of the upstream-side $O_2$ sensor, air-fuel ratio correction amount, and the output of the downstream-side $O_2$ sensor respectively when the upstream-side $O_2$ sensor is in an abnormal state, and FIG. 4 indicating the $O_2$ storage effect of the catalyst converter. In this condition, an amplitude of the air-fuel ratio correction amount FAF becomes larger as shown in FIG. 3B and the air-fuel ratio A/F fluctuates beyond the controllable window $W_1$ of the air-fuel ratio as shown in FIG. 4, whereby non-purificated exhaust gas is exhausted even though the catalyst converter is in normal state. In this way, the amplitude of the output of the downstream-side $O_2$ sensor becomes large and the period thereof becomes small, similar to the condition when the catalyst converter is deteriorated, so that the catalyst converter is erroneously judged to be deteriorated.

SUMMARY OF THE INVENTION

An object of the present invention is to provide a method and apparatus for preventing a misjudgement of a deterioration of a catalyst converter disposed within an exhaust gas passage of an internal combustion engine having two air-fuel ratio sensors upstream and downstream of the catalyst converter by monitoring an output of the air-fuel ratio sensors upstream of the catalyst converter.

According to the present invention, in a double air-fuel ratio sensor system including two $O_2$ sensors upstream and downstream of a catalyst converter provided in an exhaust passage, an air-fuel ratio correction amount is calculated in accordance with the output of the upstream $O_2$ sensor, and the actual air-fuel ratio is adjusted in accordance with the calculated air-fuel ratio correction amount and the output of the upstream-side $O_2$ sensor. Further, an operation for judging a deterioration of the catalyst converter is carried out in accordance with the output the downstream-side $O_2$ sensor while the air-fuel ratio of the engine is adjusted. Contrary to this, the judging operation is prohibited when an abnormal state of the upstream-side $O_2$ sensor is detected in accordance with the output of the upstream-side $O_2$ sensor.

BRIEF DESCRIPTION OF THE DRAWINGS

The present invention will be more clearly understood from the description set forth below with reference to the accompanying drawings, wherein:

FIG. 2A is a waveform indicating an output of an upstream-side $O_2$ sensor in a nomal state;

FIG. 2B is a waveform indicating a calculated air-fuel correction amount when the upstream-side $O_2$ sensor is in a normal state;

FIG. 2C is a waveform indicating an output of an downstream-side $O_2$ sensor when the upstream-side $O_2$ sensor is in a normal state;

FIG. 3A is a waveform indicating an output of an upstream-side $O_2$ sensor in an abnormal state;

FIG. 3B is a waveform indicating a calculated air-fuel correction amount when the upstream-side $O_2$ sensor is in an abnormal state:

FIG. 3C is a waveform indicating an output of an downstream-side $O_2$ sensor when the upstream-side $O_2$ sensor is in an abnormal state;

FIGS. 6, 6A, 6B, 8, 9, 9A; 9B, 9C, 11, 11A, 11B, 11C, and 12 are flowcharts showing the operation of the control circuit of FIG. 5;

FIGS. 10A through 10D are timing diagrams explaining the flowcharts of FIGS. 9A through 9C.

DESCRIPTION OF THE PREFERRED EMBODIMENTS

Figure 1A:
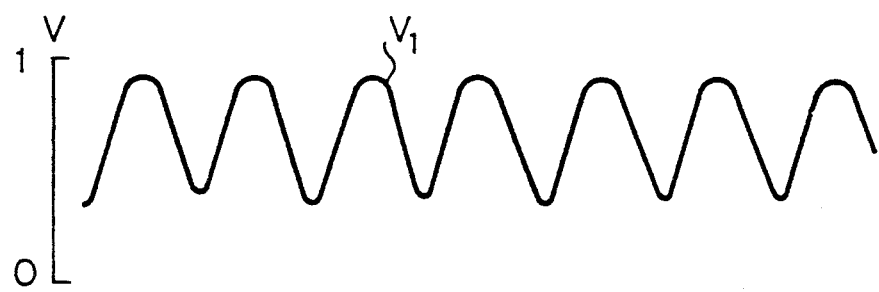
FIG. 1A is a waveform indicating an output $V_1$ of an upstream-side $O_2$ sensor.
Figure 1B:
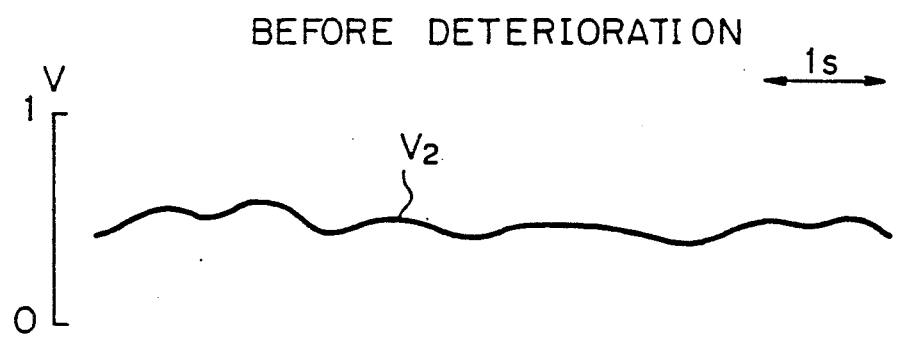
FIG. 1B is a waveform indicating an output $V_2$ of an downstream-side $O_2$ sensor before the deterioration of a catalyst converter.
Figure 1C:
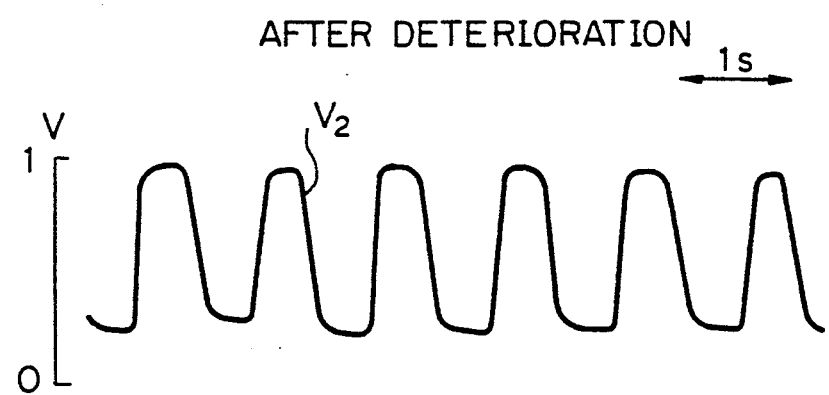
FIG. 1C is a waveform indicating an output $V_2$ of an downstream-side $O_2$ sensor after the deterioration of a catalyst converter.
Figure 4:
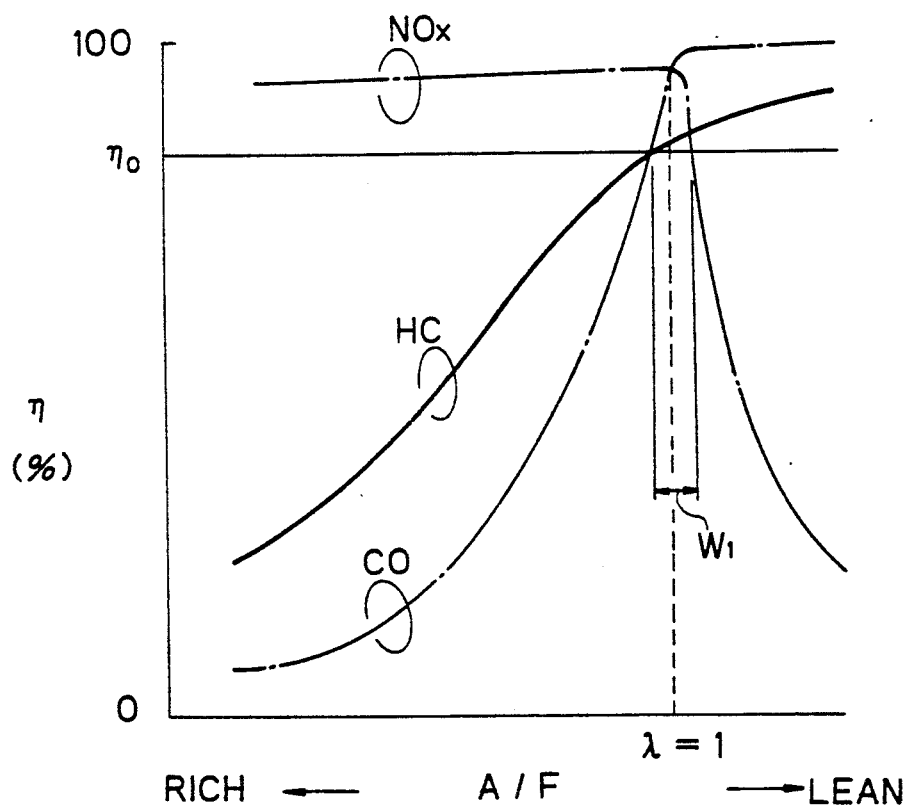
FIG. 4 is a graph showing a relationship between the air-fuel ratio A/F and the purifying rate $\eta$ for the NOx and CO and the controllable window $W_1$ of the air-fuel ratio to the stoichiometric ratio.
Figure 5:
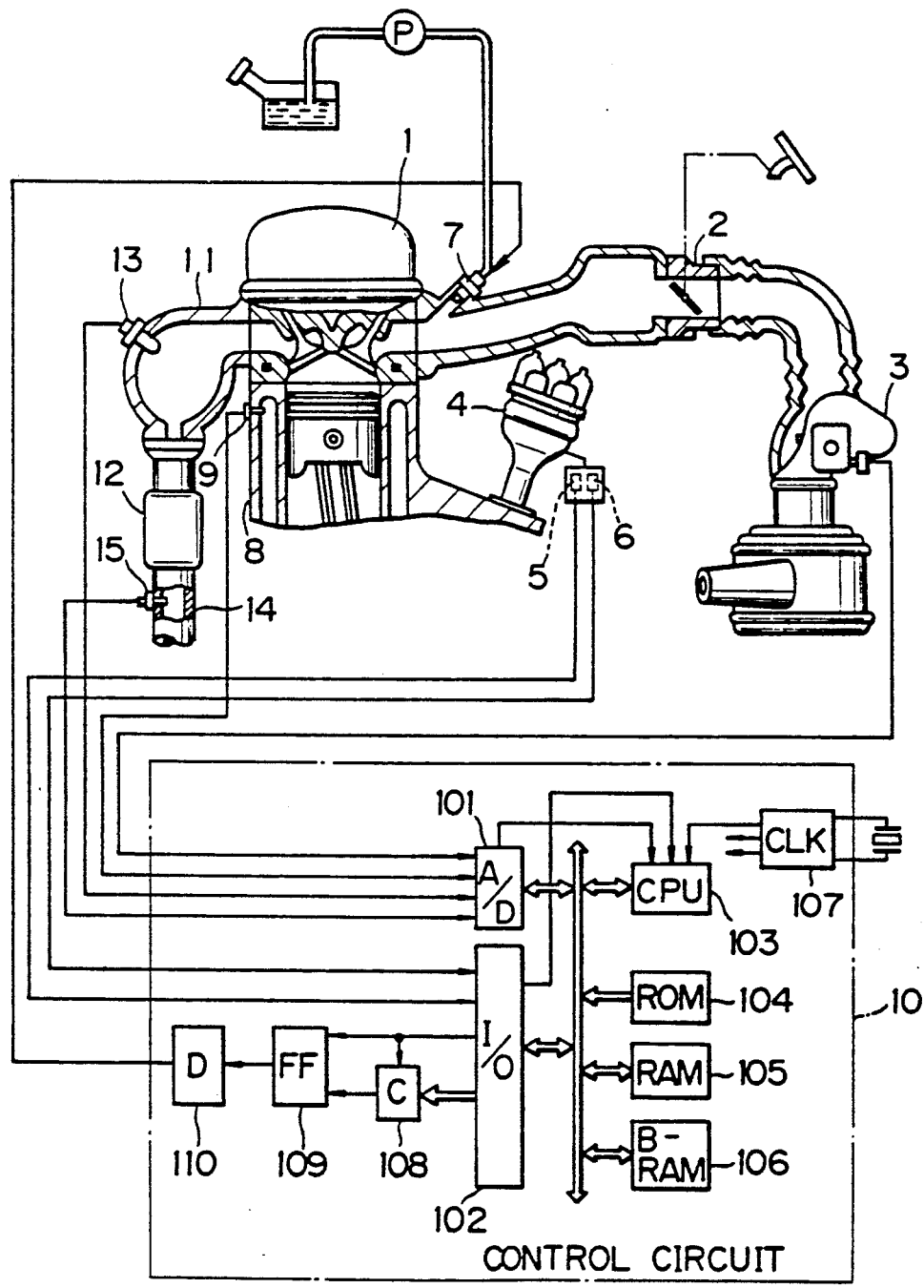
FIG. 5 is a schematic view of an internal combustion engine according to the present invention.

In FIG. 5, which illustrates an internal combustion engine according to the present invention, reference numeral 1 designates a four-cycle spark ignition engine disposed in an automotive vehicle. Provided in an air-intake passage 2 of the engine 1 is a potentiometer-type airflow meter 3 for detecting the amount of air taken into the engine 1, to generate an analog voltage signal in proportion to the amount of air flowing therethrough. The signal from the airflow meter 3 is transmitted to a multiplexer-incorporating analog-to-digital (A/D) converter 101 of a control circuit 10.

Disposed in a distributor 4 are crank-angle sensors 5 and 6 for detecting the angle of the crankshaft (not shown) of the engine 1. In this case, the crank-angle sensor 5 generates a pulse signal at every 720° crank angle (CA) and the crank-angle sensor 6 generates a pulse signal at every 30° signals CA. The pulse signals of the crank-angle sensors 5 and 6 are supplied to an input/output (I/O) interface 102 of the control circuit 10. In addition, the pulse signal of the crank-angle sensor 6 is then supplied to an interruption terminal of a central processing unit (CPU) 103 to be used as a 30° CA interruption signal for calculating a rotational speed Ne of the engine and an amount of fuel injection TAU.

Also provided in the air-intake passage 2 is a fuel injection valve 7 for supplying pressurized fuel from the fuel system (not shown) to the air-intake port of the cylinder of the engine 1. Note, other fuel injection valves are also provided for other cylinders, although not shown in FIG. 5.

Disposed in a cylinder block 8 of the engine 1 is a coolant temperature sensor 9 for detecting the temperature of the coolant. The coolant temperature sensor 9 generates an analog voltage signal in response to the temperature of the coolant and transmits it to the A/D converter 101 of the control circuit 10.

Provided in an exhaust system on the downstream-side of an exhaust manifold 11 is a three way reducing and oxidizing catalyst converter 12 which removes three pollutants CO, HC, and NOx simultaneously from the exhaust gas.

Provided on the concentration portion of the exhaust manifold 11, i.e., upstream of the catalyst converter 12, is a first $O_2$ sensor 13 for detecting the concentration of oxygen composition in the exhaust gas. Further, provided in an exhaust pipe 14 downstream of the catalyst converter 12 is a second $O_2$ sensor 15 for detecting the concentration of oxygen composition in the exhaust gas. The $O_2$ sensor 13 and 15 generate output voltage signals and transmit them to the A/D converter 101 of the control circuit 10.

The control circuit 10, which may be constructed by a microcomputer, further comprises a central processing unit (CPU) 103, a read-only memory (ROM) 104 for storing a main routine, interrupt routines such as a fuel injection routine, an ignition timing routine, tables (maps), and constants, etc., a random access memory 105 (RAM) for storing temporary data, a backup RAM 106, a clock generator 107 for generating various clock signals, a down counter 108, a flip-flop 109, a drive circuit 110 for driving the injection valve 7 and the like.

Note that the battery (not shown) is connected directly to the backup RAM 106 and, therefore, the content thereof is not erased even when the ignition switch (not shown) is turned off.

The down counter 108, the flip-flop 109, and the drive circuit 110 are used for controlling the fuel injection valve 7. That is, when a fuel injection amount TAU is calculated in a TAU routine, which will be later explained, the amount TAU is preset in the downcounter 108, and simultaneously, the flip-flop 109 is set. As a result, the drive circuit 110 initiates the activation of the fuel injection valve 7. On the other hand, the down counter 108 counts up the clock signal from the clock generator 107, and finally generates a logic "1" signal from the carry-out terminal thereof, to reset the flip-flop 109, so that the drive circuit 110 stops the activation of the fuel injection valve 7. Thus, the amount of fuel corresponding to the fuel injection amount TAU is injected into the fuel injection valve 7.

Interruptions occur at the CPU 103, when the A/D converter 101 completes an A/D conversion and generates an interrupt signal; when the crank angle sensor 6 generates a pulse signal; and when the clock generator 109 generates a special clock signal.

The intake air amount data Q of the airflow meter 3 and the coolant temperature data THW are fetched by an A/D conversion routine(s) executed at every predetermined intervals and are then stored in the RAM 105. Namely, the data Q and THW in the RAM 105 are renewed at predetermined intervals. The engine speed Ne is calculated by an interrupt routine executed at 30° CA, i.e., at every pulse signal of the crank angle sensor 6, and is then stored in the RAM 105.

The operation of the control circuit 10 of FIG. 5 will be explained with reference to the flow charts of FIGS. 6, 6A, 6B, 8, 9, 9A, 9B, 9C, 11, 11A, 11B, 11C, and 12.

Figure 6B:
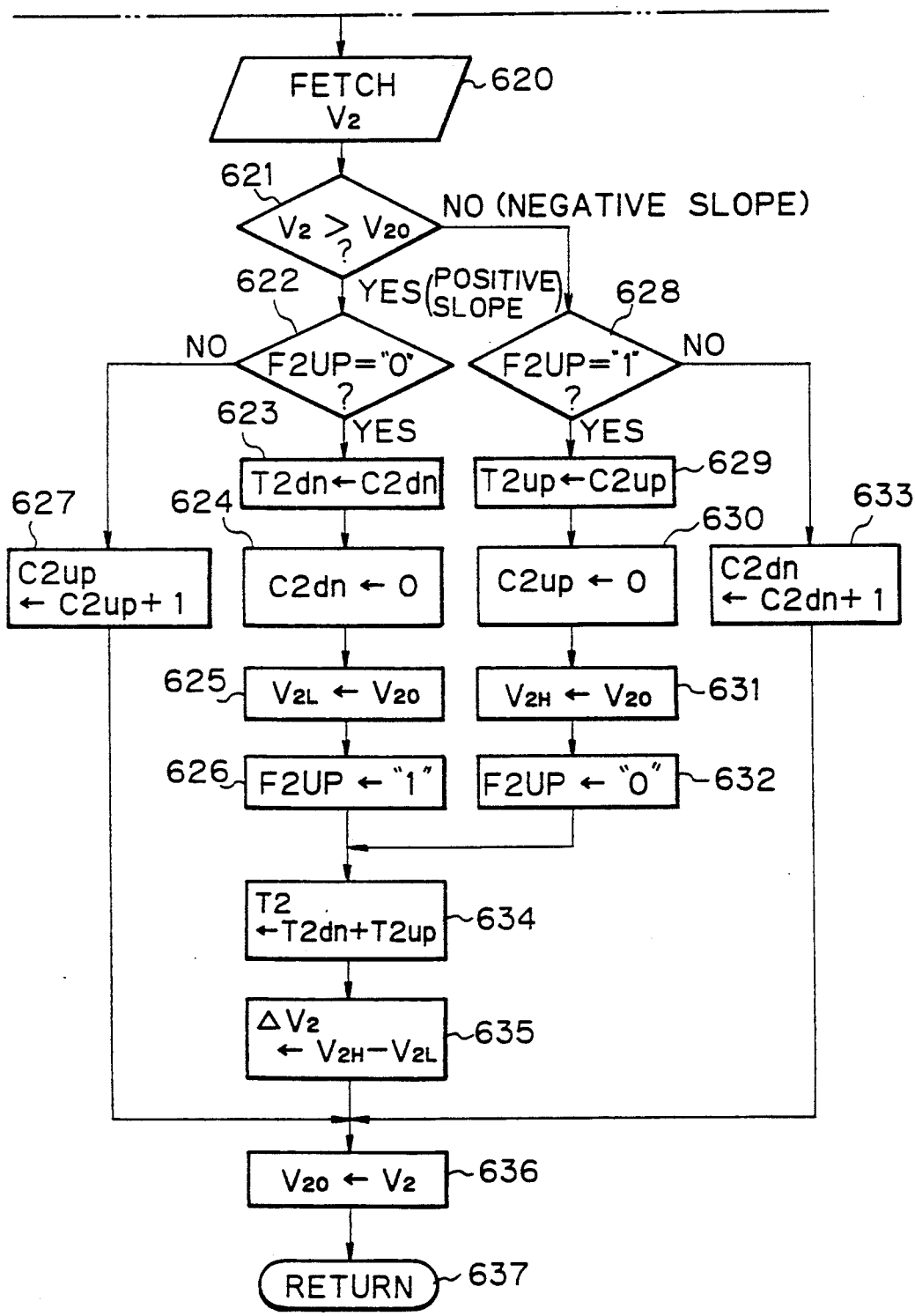

FIGS. 6A and 6B show a routine for calculating amplitudes and periods of the output $V_1$ and $V_2$ of the $O_2$ sensors 13 and 15, executed at a predetermined time such as 4 ms. Steps 601 through 619 are used for the upstream-side $O_2$ sensor 13, and steps 620 through 637 are used for the downstream-side $O_2$ sensor 15.

At step 601, an A/D conversion is performed upon the output $V_1$ of the upstream-side $O_2$ sensor 13, and at step 602, it is determined whether or not $V_1 > V_{10}$ is satisfied. Here, $V_{10}$ is a value of the output $V_1$ previously fetched by this routine. If $V_1 > V_{10}$ (positive slope), the control proceeds to step 603 which determines whether or not a flag F1UP is "0", and if $V_1 < V_{10}$ (negative slope), the control proceeds to step 609 which determines whether or not the flag F1UP is "1". Here, the flag F1UP (= "1") shows that the output $V_1$ of the upstream-side $O_2$ sensor 13 is being increased. Therefore, at step 603, if F1UP="0", this means that the output $V_1$ of the upstream-side $O_2$ sensor 13 is reversed from the decrease side to the increase side, and if F1UP="1", this means that the output $V_1$ of the upstream-side $O_2$ sensor 13 is being increased. On the other hand, at step 609, if F1UP="1", this means that the output $V_1$ of the upstream-side $O_2$ sensor 13 is reversed from the increase side to the decrease side and if F1UP="0", that the output $V_1$ of the upstream-side $O_2$ sensor 13 is being decreased.

When the output $V_1$ of the upstream-side $O_2$ sensor 13 is being increased, the control proceeds to step 608 which counts up an increase period counter C1up by 1, when the output $V_1$ of the upstream-side $O_2$ sensor 13 is being decreased, the control proceeds to step 614 which counts up a decrease period counter C1dn by 1.

Figures 7A, 7B, 7C, 7D:
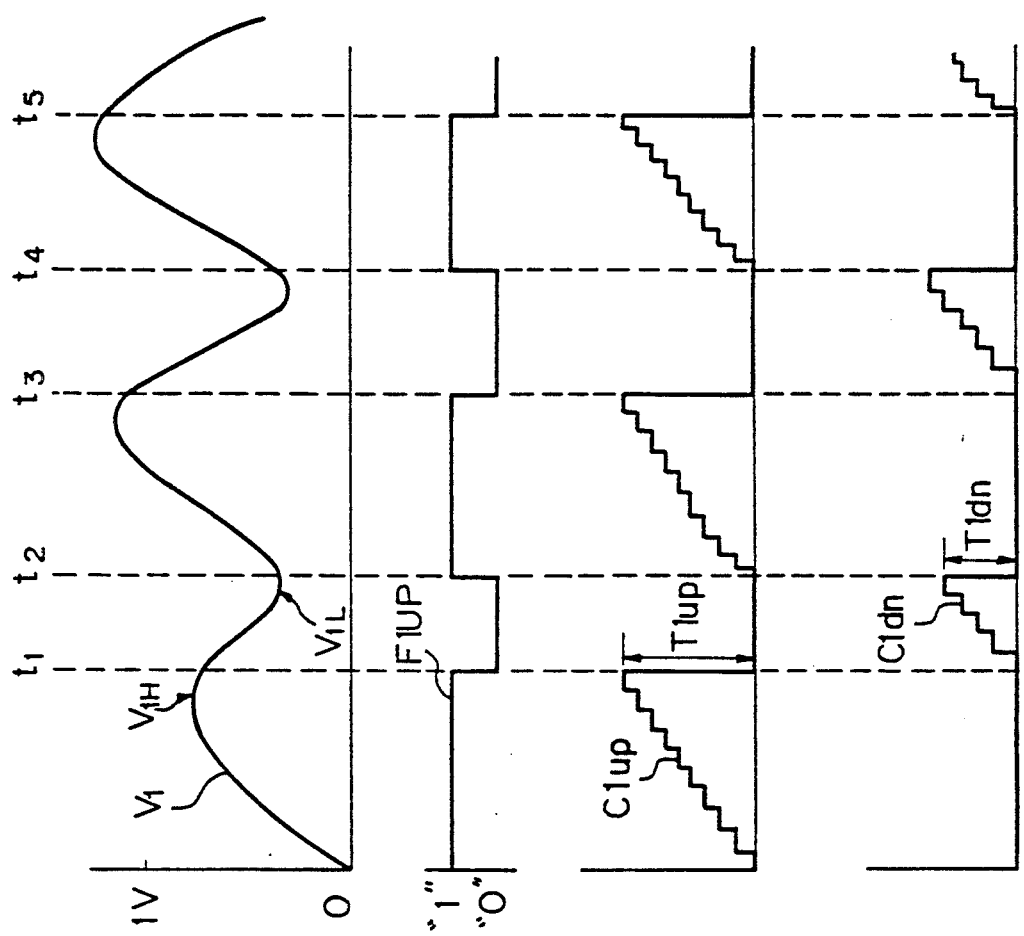
FIGS. 7A through 7D are timing diagrams explaining the flowcharts of FIGS. 6A and 6B.

Thus, when the output $V_1$ of the upstream-side $O_2$ sensor 13 is changed as shown in FIG. 7A, the flag F1UP is changed as shown in FIG. 7B. As a result, the increase period counter C1up and the decrease period counter C1dn are changed as shown in FIGS. 7C and 7D.

At each time $t_2, t_4, \ldots$, when the output $V_1$ of the upstream-side $O_2$ sensor 13 is reversed from the decrease side to the increase side, the control proceeds to steps 604 through 607. That is, at step 604, a decrease period T1dn is calculated by T1dn ← C1dn.

Then at step 605, the decrease period counter C1dn is cleared. Next, at step 606, a minimum value $V_{1L}$ of the output $V_1$ of the upstream-side $O_2$ sensor 13 is calculated by $V_{1L} \leftarrow V_{10}$.

Further, at step 607, the flag F1UP is reversed.

Also at each time $t_1, t_3, t_5, \ldots$, when the output $V_1$ of the upstream-side $O_2$ sensor 13 is reversed from the increase side to the decrease side, the control proceeds to steps 610 through 613. That is, at step 610, an increase period T1up is calculated by T1up ← C1up.

Then at step 611, the increase period counter C1up is cleared. Next, at step 612, a maximum value $V_{1H}$ of the output $V_1$ of the upstream-side $O_2$ sensor 13 is calculated by $V_{1H} \leftarrow V_{10}$.

Further, at step 613, the flag F1UP is reversed.

At step 615, a period T1 of the output $V_1$ of the upstream-side $O_2$ sensor 13 is calculated by T1 ← T1dn + T1up.

At step 616, it is determined whether or not the period T1 of the output $V_1$ of the upstream-side $O_2$ sensor 13 calculated at step 615 is larger than a predetermined reference time value, such as 1 ms, to judge an abnormal state of the upstream-side $O_2$ sensor 13. If T1 ≦ 1 ms, the control proceeds to step 617 judging that the the upstream-side $O_2$ sensor 13 is in a normal state, but if T1 < 1 ms, the control proceeds to step 618, judging that the upstream-side $O_2$ sensor 13 is in an abnormal state. At step 618, a deterioration detection prohibiting flag F/B1 is set to "1". Here, the flag F/B1 (="1") shows that a monitoring operation of whether or not the catalyst converter 12 is deteriorated is being prohibited. After the step 618, the control proceeds to step 619.

At step 617, an amplitude $\Delta V_1$ of the output $V_1$ of the upstream-side $O_2$ sensor 13 is calculated by $\Delta V_1 \leftarrow V_{1H} - V_{1L}$.

At step 619, in order to prepare a next operation of this routine, the previous value $V_{10}$ is replaced by the current value $V_1$.

Similarly, the flow at steps 620 through 636 calculates a time T2 and an amplitude $\Delta V_2$ for the output $V_2$ of the downstream-side $O_2$ sensor 15.

This routine is completed by step 637.

Figure 8:
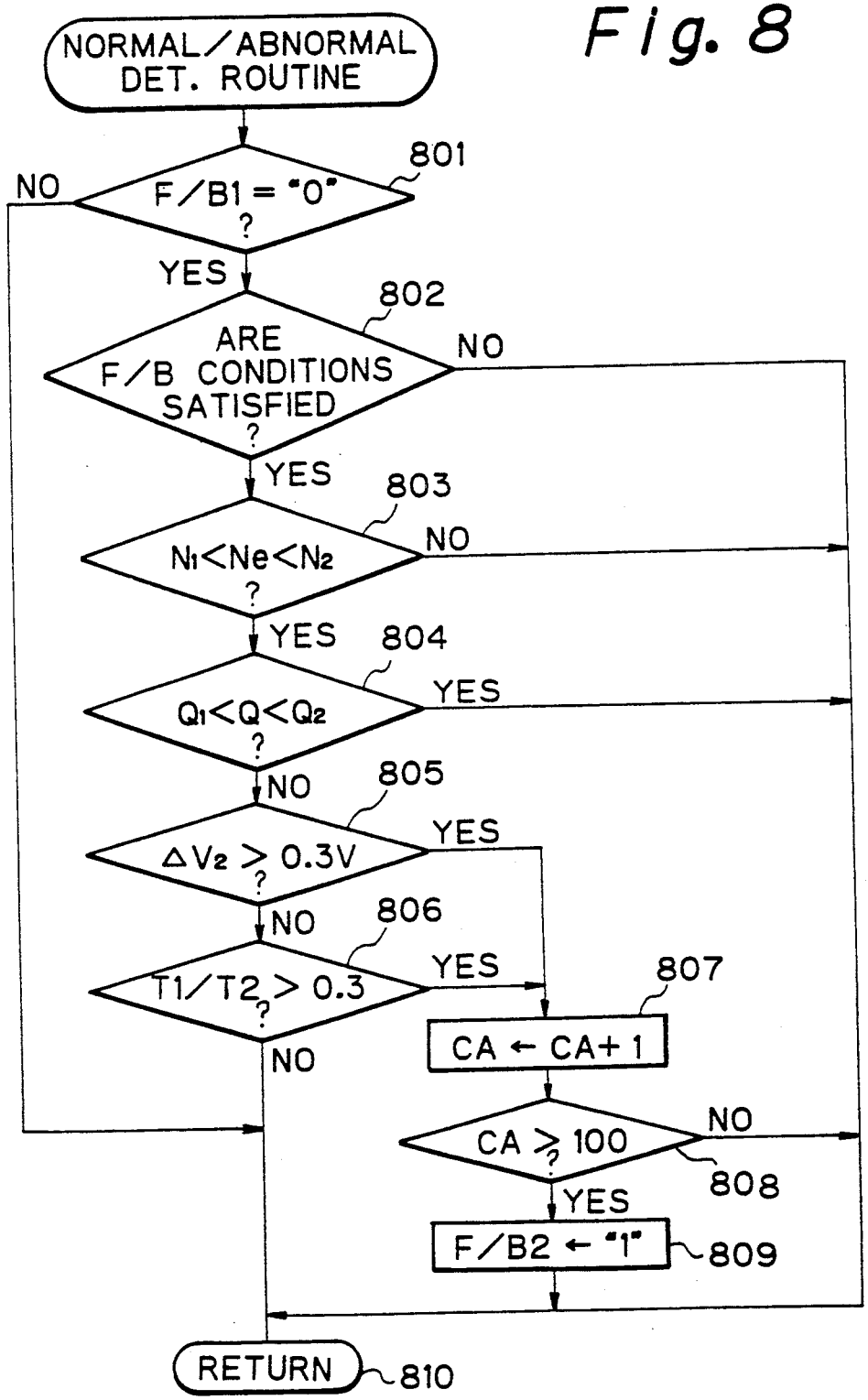

FIG. 8 is a routine for determining whether or not the $O_2$ sensors are normal or abnormal by using the calculation result of the routine of FIGS. 6A and 6B. This routine is also carried out at a predetermined time such as 4 ms.

At step 801 it is determined whether or not the flag F/B1 is "0". If F/B1="1", this means that the upstream-side $O_2$ sensor 13 is in an abnormal state, and the control proceeds to step 810 to prohibit the monitoring operation of whether or not the catalyst converter 12 is deteriorated and this routine is completed by step 810.

If F/B1="0", this means that the upstream-side $O_2$ sensor 13 is in a normal state, and the control proceeds to step 802. At step 802, it is determined whether or not all the feedback control (closed-loop control) conditions are satisfied. The feedback control conditions are as follows:

(i) the engine is not in a starting state; and
(ii) the coolant temperature THW is higher than 50° C.

Of course, other feedback control conditions are introduced as occasion demands, but an explanation of such other feedback control conditions is omitted. Also, the feedback control conditions at the upstream-side $O_2$ sensor 13 can be different from those at the downstream-side $O_2$ sensor 15.

If one or more of the feedback control conditions is not satisfied, the control proceeds to step 810 and this routine is completed.

Contrary to above, at step 802, if all of the feedback control conditions are satisfied, the control proceeds to step 803.

At step 803, the engine rotational speed data Ne is read out of the RAM 105, and it is determined whether or not the engine rotational speed data Ne is between two predetermined engine rotational speed data $N_1$ and $N_2$ such as $N_1 = 1000$ rpm and $N_2 = 4000$ rpm. Only if $1000 < Ne < 4000$ rpm, does the control proceed to step 804. That is, when the engine rotational speed Ne is too small, the response speed of the downstream-side $O_2$ sensor 15 is reduced, so that the normal/abnormal determination of the downstream-side $O_2$ sensor 15 is suspended. Contrary to this, when the engine rotational speed Ne is too large, so that the air-fuel control enters a rich air-fuel ratio region, the controlled air-fuel ratio invites hunting at the boundary of such a rich air-fuel region. Thus, also in this case, the normal/abnormal determination of the downstream-side $O_2$ sensor 15 is suspended.

Similarly, at step 804, the intake air amount data Q is read out of the RAM 105, and it is determined whether or not the intake air amount data Q is is between two predetermined intake air amount $Q_1$ and $Q_2$ such as $Q_1 = 10$ m$^3$/h and $Q_2 = 120$ m$^3$/h. Only if 10 m$^3$/h $< Q < 120$ m$^3$/h, does the control proceed to step 805. That is, when the intake air amount Q is too small, the response speed of the downstream-side $O_2$ sensor 15 is reduced, so that the normal/abnormal determination of the downstream-side $O_2$ sensor 15 is suspended. Contrary to this, when the intake air amount Q is too large, so that the air-fuel control also enters a rich air-fuel ratio region, the controlled air-fuel ratio invites hunting at the boundary of such a rich air-fuel region. Thus, also in this case also, the normal/abnormal determination of the downstream-side $O_2$ sensor 15 is suspended.

Note that one of the steps 803 and 804 can be deleted, and the upper and lower limits of Ne and Q can be changed as occasion demands.

At step 805, it is determined whether or not the amplitude $\Delta V_2$ of the downstream-side $O_2$ sensor 15 is larger than a predetermined value such as 0.3 V. If $\Delta V_2 \leq 0.3$ V, the control proceeds to step 806 and if $\Delta V_2 > 0.3$ V, the control proceeds to step 807

At step 806, it is determined whether or not the ratio of the period T1 of the output $V_1$ of the upstream-side $O_2$ sensor 13 to the period T2 of the output $V_2$ of the downstream-side $O_2$ sensor 15 is larger than a predetermined value such as 0.3. If $T1/T2 \leq 0.3$, the control proceeds to step 810 and this routine is completed, but if $T1/T2 > 0.3$, the control proceeds to step 807.

If $\Delta V_2 > 0.3$ V or $T1/T2 > 0.3$, this means that the catalyst converter 12 is deteriorated, and accordingly, the control proceeds to step 807 which counts up an accumulation counter CA for measuring the duration for which the catalyst converter 12 is deteriorated. Then the control proceeds to step 808.

At step 808, it is determined whether or not the accumulation counter CA exceeds a predetermined value such as 100. If CA > 100, the control proceeds to step 809 and if CA $\leq$ 100, the control proceeds to step 810 to complete this routine. AT step 809, a feedback control prohibiting flag F/B2 is set to "1". Here, the flag F/B2 (= "1") shows that the feedback control by the downstream-side $O_2$ sensor 15 is being prohibited. After the step 809, the control proceeds to step 810 to complete this routine.

In this way, when the feedback control prohibiting flag F/B2 is set to "1", the feedback control by the downstream-side $O_2$ sensor 15 is prohibited.

Note that, in the routine shown in FIG. 8, the accumulation counter CA is counted up when $\Delta V_2 > 0.3$ V or $T1/T2 > 0.3$ is satisfied, but one of the steps 805 and 806 can be deleted. Further, the deterioration of the catalyst converter 12 is determined by the ratio of the period T1 of the output $V_1$ of the upstream-side $O_2$ sensor 13 to the period T2 of the output $V_2$ of the downstream-side $O_2$ sensor 15, the deterioration of the catalyst converter 12 can be determined by comparing the period T2 of the output $V_2$ of the downstream-side $O_2$ sensor 15 and the lower limit value thereof in accordance with a driving condition parameter for example, an engine rotational speed Ne.

Figure 9B:
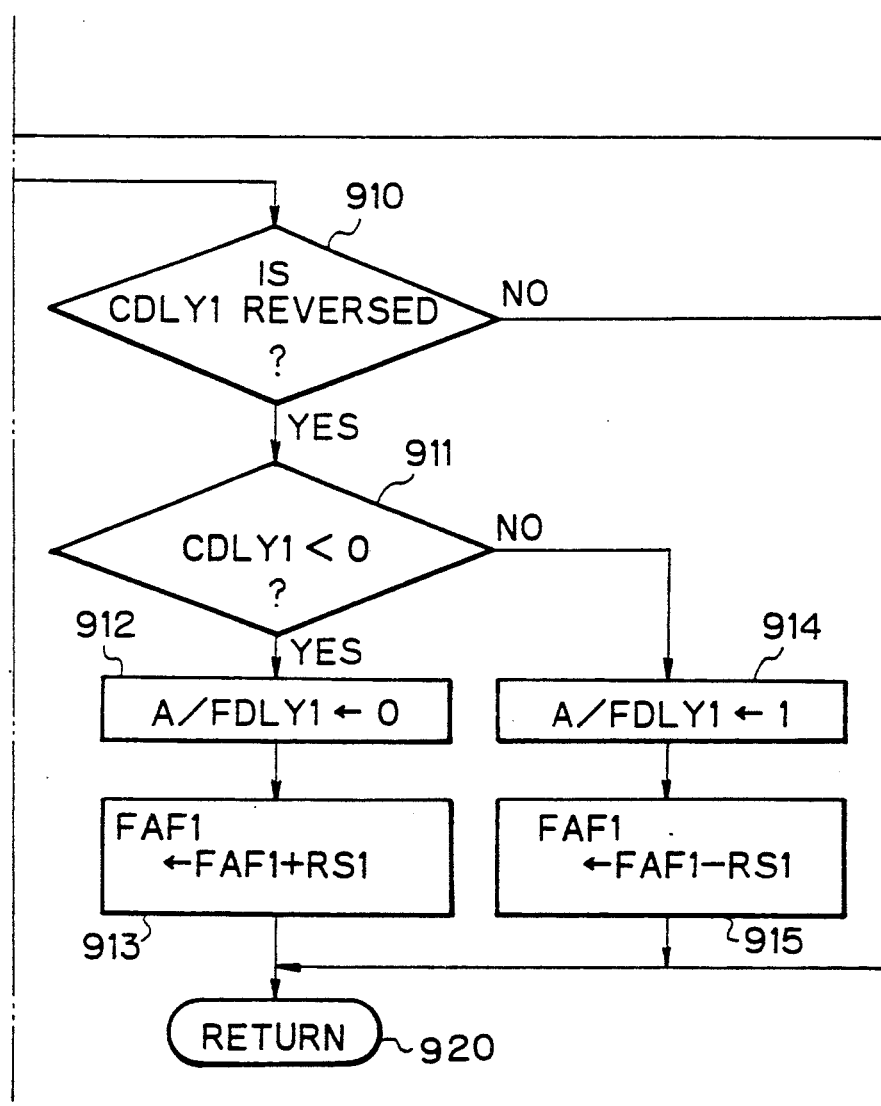
Figure 9C:
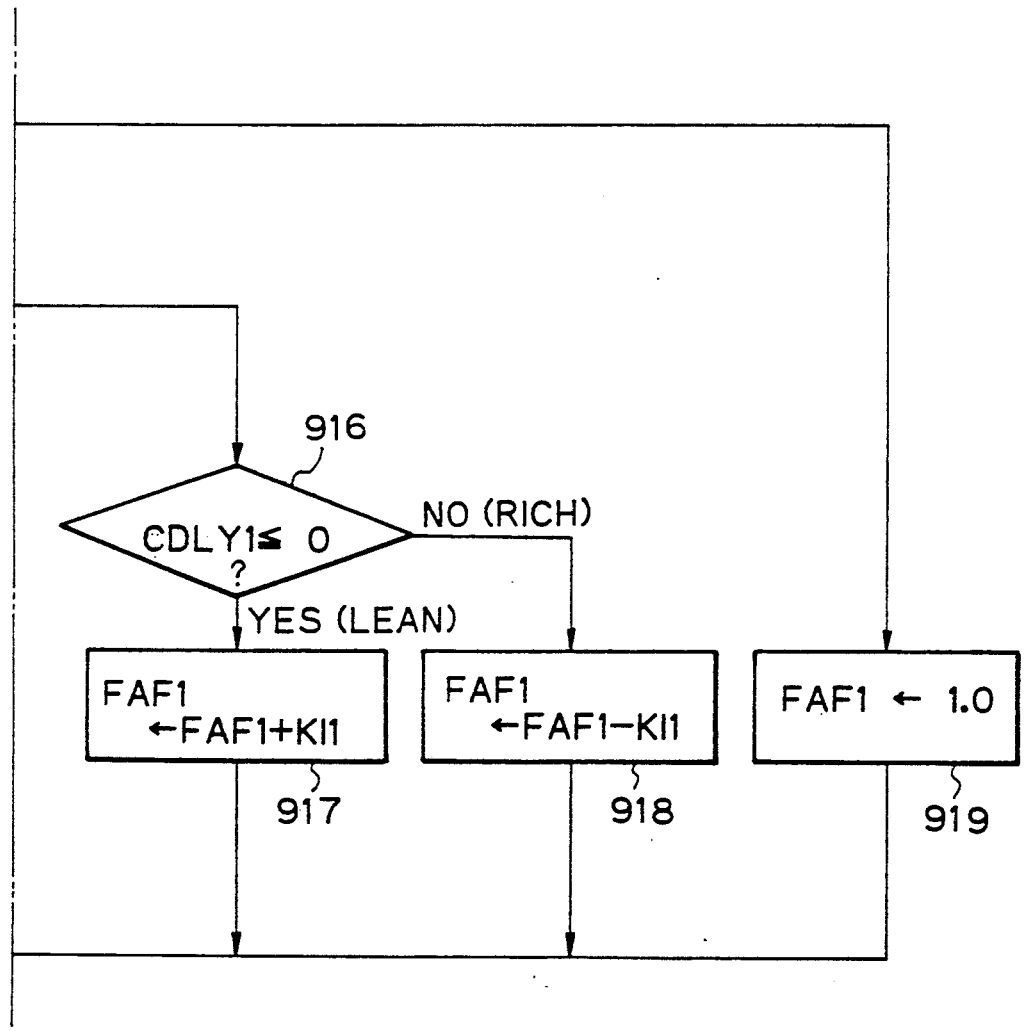

FIG. 9A through 9C show a routine for calculating a first air-fuel ratio feedback correction amount FAF1 in accordance with the output of the upstream-side $O_2$ sensor 13 executed at a predetermined time such as 4 ms.

At step 900, it is determined whether or not the deterioration detection prohibiting flag F/B1 is "0". If F/B1 = "1", this means that the upstream-side $O_2$ sensor 13 is in an abnormal state, the control proceeds to step 919 in which the amount of FAF1 is caused to be 1.0 (FAF1 = 1.0), thereby carrying out an open-loop control operation. Note that, in this case, the correction amount FAF1 can be a learning value in accordance with a driving parameter such as the engine rotational speed Ne, the intake air amount Q, the exhaust gas temperature, and so on, or a mean value immediately before the feedback control by the downstream-side $O_2$ sensor 15 is stopped.

If F/B1 = "0", this means that the upstream-side $O_2$ sensor 13 is in a normal state, the control proceeds to step 901. At step 901, it is determined whether or not all the feedback control (closed-loop control) conditions are satisfied in the same way as at step 802 if FIG. 8. If one or more of the feedback control conditions is not satisfied, the control proceeds to step 920 and previously explained open-loop control operation is carried out.

Contrary to above, at step 901, if all of the feedback control conditions are satisfied, the control proceeds to step 902.

At step 902, an A/D conversion is performed upon the output voltage $V_1$ of the upstream-side $O_2$ sensor 13, and A/D converted value thereof is then fetched from the A/D converter 101. Then at step 903, the voltage $V_1$ is compared with a reference voltage $V_{R1}$ such as 0.45 V, thereby determining whether the current air-fuel ratio detected by the upstream-side $O_2$ sensor 13 is on the rich side with respect to the stoichiometric air-fuel ratio.

If $V_1 \leq V_{R1}$, which means that the current air-fuel ratio is lean, the control proceeds to step 904. At step 904, a first delay counter CDLY1 is counted down by 1, and at step 905 and 906, the first delay counter CDLY1 is guarded by the minimum value TDR1. That is, it is determined whether or not CDLY1<TDR1 at step 905 and the value of the delay counter CDLY1 is replaced by the minimum value TDR1 if CDLY1<TDR1 at step 906. Note that, TDR1 is a rich delay time for which a lean state is maintained even after the output of the upstream-side $O_2$ sensor 13 is changed from the lean side to the rich side, and is defined by a negative value.

On the other hand, if $V_1 > V_{R1}$, which means that the current air-fuel ratio is rich, the control proceeds to step 907. At step 907, a first delay counter CDLY1 is counted up by 1, and at step 908 and 909, the first delay counter CDLY1 is guarded by the maximum value TDL1. That is, it is determined whether or not CDLY1>TDL1 at step 908 and the value of the delay counter CDLY1 is replaced by the maximum value TDL1 if CDLY1>TDL1 at step 909. Note that, TDL1 is a lean delay time for which a rich state is maintained even after the output of the upstream-side $O_2$ sensor 13 is changed from the rich side to the lean side, and is defined by a positive value.

At step 910, it is determined whether or not the first delay counter CDLY1 is reversed, i.e., whether or not the first delay counter CDLY1 is reversed from a negative value to a positive value or from a positive value to a negative value. Note that, the reference value of the first delay counter CDLY1 is 0, and an air-fuel ratio after the delay operation A/FDLY1 when CDLY1>0 is considered to be rich (A/FDLY1=1) and an air-fuel ratio after the delay operation A/FDLY1 when CDLY1≦0 is considered to be lean (A/FDLY1=1).

If the first delay counter CDLY1 is reversed, the control proceeds to step 911 and it is determined whether or not the first delay counter CDLY1 is a negative value. If CDLY1<0, the control proceeds to steps 912 and 913 in which A/FDLY1←0, and

FAF1←FAF1+RS1.

That is, the air-fuel ratio after the delay operation A/FDLY1 is changed from the rich side to the lean side, and the correction amount FAF1 is increased by adding a skip amount RS1. If CDLY1>0 at step 911, the control proceeds to steps 914 and 915 in which A/FDLY1←1, and

FAF1←FAF1−RS1.

That is, the air-fuel ratio after the delay operation A/FDLY1 is changed from the lean side to the rich side, and the correction amount FAF1 is decreased by subtracting a skip amount RS1.

If the first delay counter CDLY1 is not reversed at step 910, the control proceeds to step 916 and it is determined whether or not the first delay counter CDLY1 is smaller than or equal to 0. If CDLY1≦0 which means the air-fuel ratio after the delay operation A/FDLY1 is lean, the control proceeds to step 917 in which

FAF1←FAF1+KI1.

That is, the correction amount FAF1 is increased by adding an integration amount KI1. If CDLY1>0, which means the air-fuel ratio after the delay operation A/FDLY1 is rich, the control proceeds to step 918 in which

FAF1←FAF1−KI1.

That is, the correction amount FAF1 is decreased by subtracting an integration amount KI1.

Here, the integration amount KI1 is sufficiently smaller than the skip amount RS1, i.e., KI1<<RS1. Accordingly, an amount of fuel injection is increased or decreased gradually at step 917 or 918, though the amount of fuel injection is increased or decreased skippingly at step 913 or 915.

The calculated the correction amount FAF1 is stored in the RAM 105 and this routine is completed at step 920.

In this way, the first air-fuel ratio correction amount FAF1 is calculated in accordance with the delay operated output of the upstream-side $O_2$ sensor 13 when the upstream-side $O_2$ sensor 13 is in a normal state, although it is not calculated when the upstream-side $O_2$ sensor 13 is in an abnormal state.

The operation by the flow chart of FIGS. 9A through 9D will be further explained with reference to FIGS. 10A through 10D. As illustrated in FIG. 10A, when the air-fuel ratio A/F is obtained by the output of the upstream-side $O_2$ sensor 13, the first delay counter CDLY1 is counted up during a rich state, and is counted down during a lean state, as illustrated in FIG. 10B. As a result, a delayed air-fuel ratio A/FDLY1 is obtained as illustrated in FIG. 10C. For example, at time $t_1$, even when the air-fuel ratio A/F is changed from the lean side to the rich side, the delayed air-fuel ratio A/FDLY1 is changed at time $t_2$ after the rich delay time period TDR1. Similarly, at time $t_3$, even when the air-fuel ratio A/F is changed from the rich side to the lean side, the delayed air-fuel ratio A/FDLY1 is changed at time $t_4$ after the lean delay time TDL1.

At time $t_5$, $t_6$, or $t_7$, however, when the air-fuel ratio A/F is reversed within a shorter time than the rich delay time TDR1, the delayed air-fuel ratio A/FDLY1 is reversed at time $t_8$. In the same manner, the delayed air-fuel ratio A/FDLY1 is not reversed when the air-fuel ratio A/F is reversed within a shorter time than the lean delay time TDL1. That is, the delayed air-fuel ratio A/FDLY1 is stable when compared with the air-fuel ratio A/F.

Further, as illustrated in FIG. 10D, at every change of the delayed air-fuel ratio A/FDLY1 from the rich side to the lean side, or vice versa, the correction amount FAF1 is shifted by the skip amount RS1. After that, the delayed air-fuel ratio A/FDLY1 is gradually increased or decreased by the integration amount KI1.

Air-fuel ratio feedback control operation by the downstream-side $O_2$ sensor 15 will be explained. There are two types of air-fuel ratio feedback control operations by the downstream-side $O_2$ sensor 15, i.e., the operation type in which a second air-fuel ratio correction amount FAF2 is introduced thereinto, and the operation type in which an air-fuel ratio feedback control constant in the air-fuel ratio feedback control operation by the upstream-side O₂ sensor 13 is variable. Further, as the air-fuel ratio feedback control constant, there are nominated a rich delay time TDR1, a lean delay time TDL1, a skip amount RS1 (in more detail, the rich skip amount RSR1 and the lean skip amount RSL1), and an integration amount KI1 (in more detail, the rich integration amount KIR1 and the lean integration amount KIL1).

For example, if the rich delay time becomes larger than the lean delay time (TDR1>TDL1), the controlled air-fuel ratio becomes richer, and if the lean delay time becomes larger than the rich delay time (TDL1>TDR1), the controlled air-fuel ratio becomes leaner. Thus, the air-fuel ratio can be controlled by changing the rich delay time TDR1 and the lean delay time TDL1 in accordance with the downstream-side O₂ sensor 15. Also, if the rich skip amount RSR1 is increased or if the lean skip amount RSL1 is decrease, the controlled air-fuel ratio becomes richer, and if the lean skip amount RSL1 is increased or if the rich skip amount RSR1 is decreased, the controlled air-fuel ratio becomes leaner. Thus, the air-fuel ratio can be controlled by changing the rich skip amount RSR1 and the lean skip amount RSL1 in accordance with the downstream-side O₂ sensor 15.

Further, if the rich integration amount KIR1 is increased or if the lean integration amount KIL1 is decrease, the controlled air-fuel ratio becomes richer, and if the lean integration amount KIL1 is increased or if the rich integration amount KIR1 is decreased, the controlled air-fuel ratio becomes leaner. Thus, the air-fuel ratio can be controlled by changing the rich integration amount KIR1 and the lean integration amount RSL1 in accordance with the downstream-side O₂ sensor 15. Still further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the downstream-side O₂ sensor 15.

A double O₂ sensor system into which a second air-fuel ratio correction amount FAF2 is introduced will be explained with reference to FIGS. 11A through 11C.

Figure 11A:
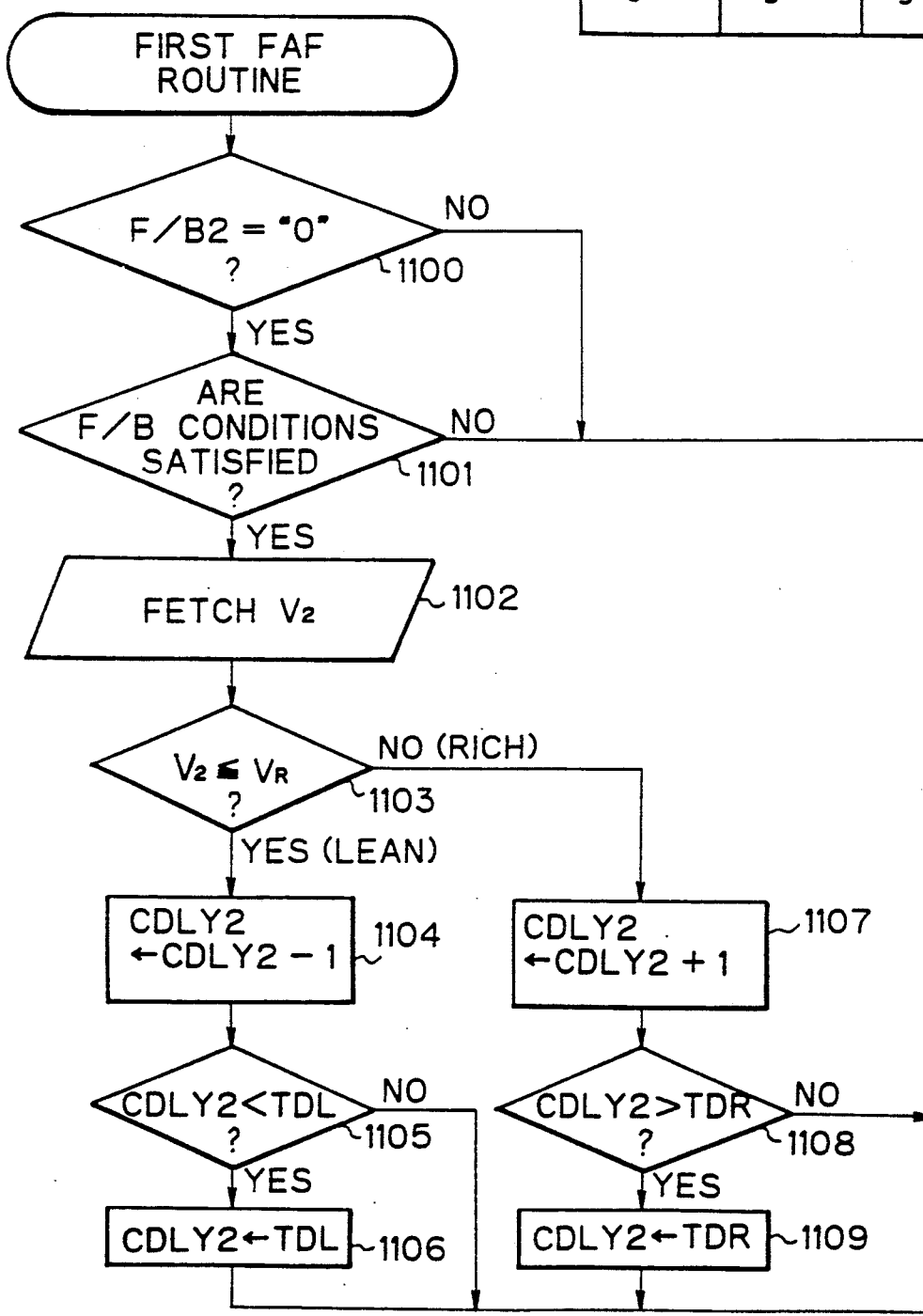
Figure 11B:
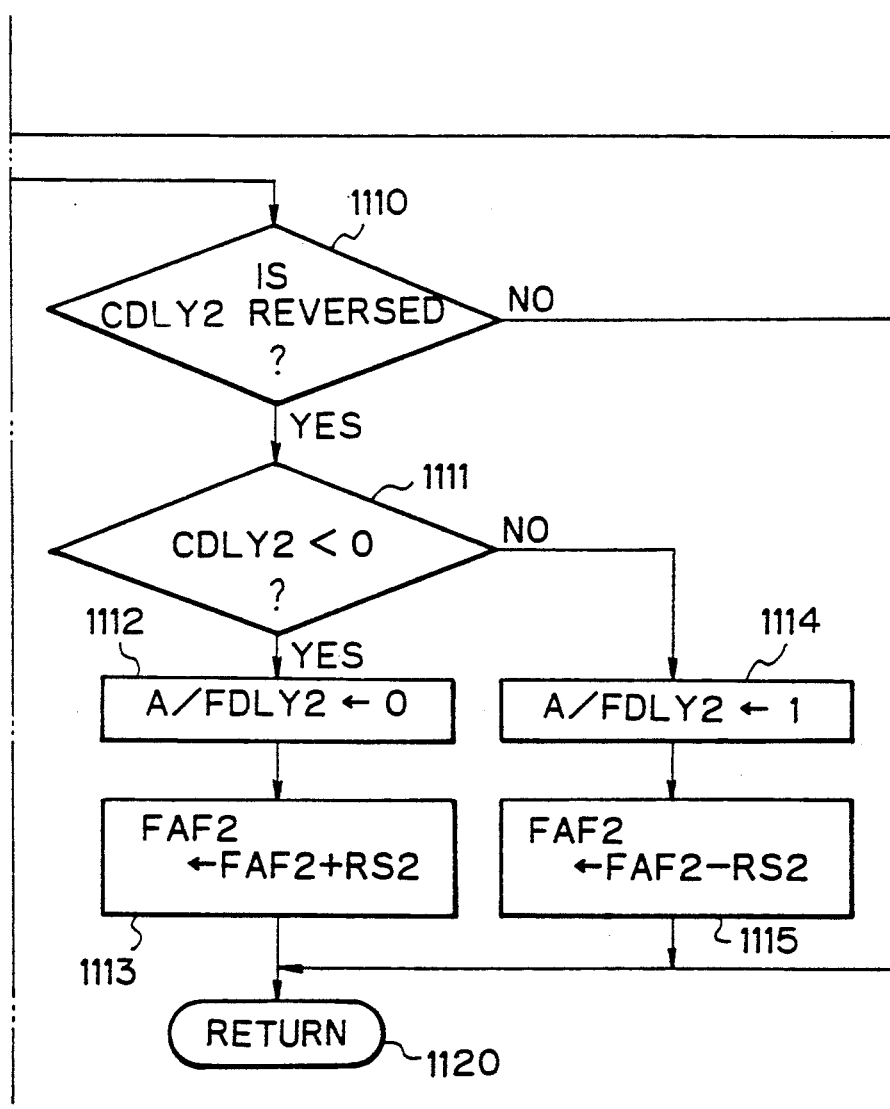
Figure 11C:
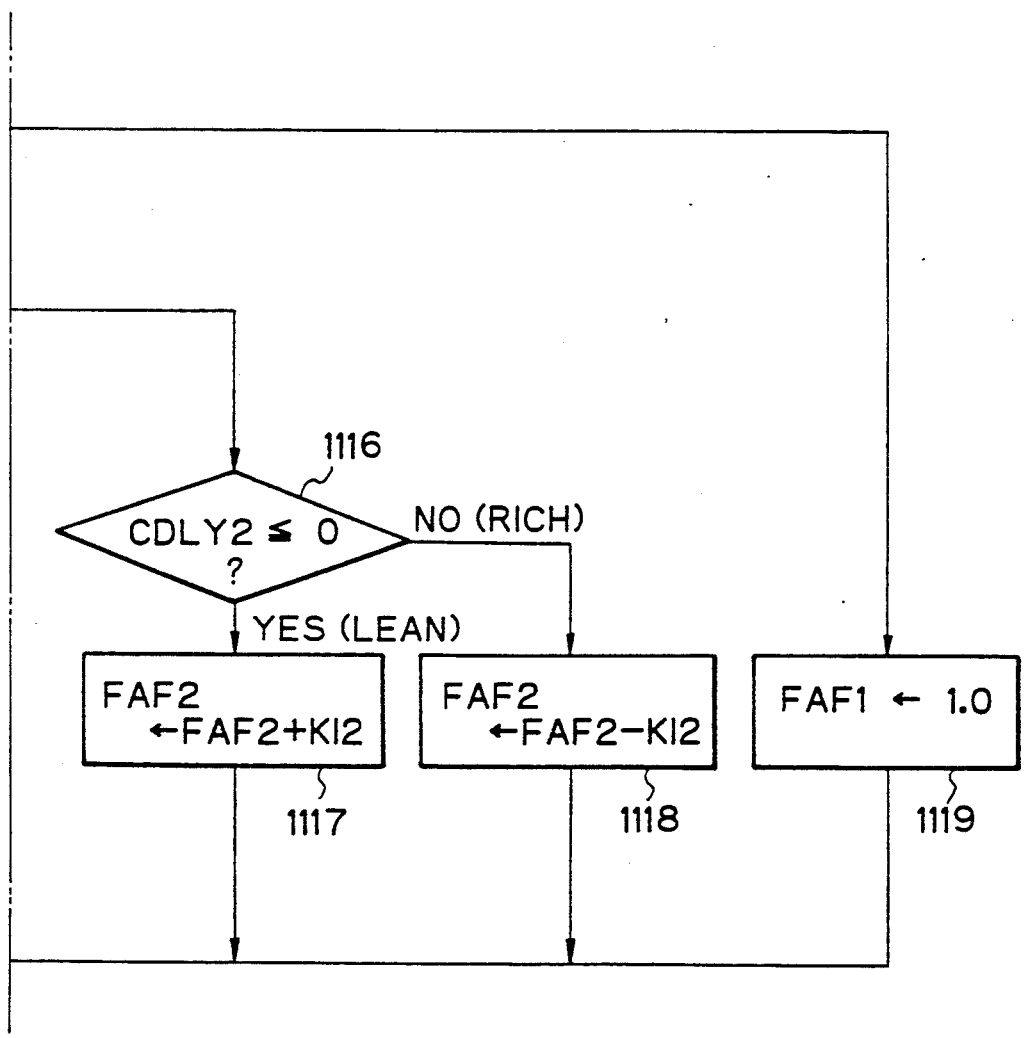

FIG. 11A through 11C show a routine for calculating a first air-fuel ratio feedback correction amount FAF2 in accordance with the output of the upstream-side O₂ sensor 15 executed at a predetermined time such as 1 s.

At step 1100, it is determined whether or not the deterioration detection prohibiting flag F/B2 is "0". If F/B2="1", this means that the catalyst converter 12 is deteriorated, the control proceeds to step 1119 in which the amount of FAF2 is caused to be 1.0 (FAF2=1.0), thereby carrying out an open-loop control operation. Note that, also in this case, the correction amount FAF2 can be a learning value in accordance with a driving parameter such as the engine rotational speed Ne, the intake air amount Q, the exhaust gas temperature, and so on, or a mean value immediately before the feedback control by the downstream-side O₂ sensor 15 is stopped.

If F/B2="0", this means that the catalyst converter 12 is not deteriorated, the control proceeds to step 1101. At step 1101, it is determined whether or not all the feedback control (closed-loop control) conditions are satisfied in the same way as at step 802 if FIG. 8. If one or more of the feedback control conditions is not satisfied, the control proceeds to step 1119 and previously explained open-loop control operation is carried out.

Contrary to above, at step 1101, if all of the feedback control conditions are satisfied, the control proceeds to step 1102.

At step 1102, an A/D conversion is performed upon the output voltage V₂ of the downstream-side O₂ sensor 15, and A/D converted value thereof is then fetched from the A/D converter 101. Then at step 1103, the voltage V₂ is compared with a reference voltage $V_{R2}$ such as 0.55 V, thereby determining whether the current air-fuel ratio detected by the downstream-side O₂ sensor 15 is on the rich side with respect to the stoichiometric air-fuel ratio. Note that the reference voltage $V_{R2}$ (=0.55 V) is preferably higher than the reference voltage $V_{R1}$ (=0.45 V), in consideration of the difference in output characteristics and deterioration speed between the upstream-side O₂ sensor 13 upstream of the catalyst converter 12 and the downstream-side O₂ sensor 15 downstream of the catalyst converter 12.

If $V_2 \leq V_{R2}$, which means that the current air-fuel ratio is lean, the control proceeds to step 1104. At step 1104, a second delay counter CDLY2 is counted down by 1, and at step 1105 and 1106, the second delay counter CDLY2 is guarded by the minimum value TDR2. That is, it is determined whether or not CDLY2<TDR2 at step 1105 and the value of the delay counter CDLY2 is replaced by the minimum value TDR2 if CDLY2<TDR2 at step 1106. Note that, TDR2 is a rich delay time for which a lean state is maintained even after the output of the downstream-side O₂ sensor 15 is changed from the lean side to the rich side, and is defined by a negative value.

On the other hand, if $V_2 > V_{R2}$, which means that the current air-fuel ratio is rich, the control proceeds to step 1107. At step 1107, a second delay counter CDLY2 is counted up by 1, and at step 1108 and 1109, the second delay counter CDLY2 is guarded by the maximum value TDL2. That is, it is determined whether or not CDLY2>TDL2 at step 1108 and the value of the delay counter CDLY2 is replaced by the maximum value TDL2 if CDLY2>TDL2 at step 1109. Note that, TDL2 is a lean delay time for which a rich state is maintained even after the output of the downstream-side O₂ sensor 15 is changed from the rich side to the lean side, and is defined by a positive value.

At step 1110, it is determined whether or not the second delay counter CDLY2 is reversed, i.e., whether or not the second delay counter CDLY2 is reversed from a negative value to a positive value or from a positive value to a negative value. Note that, the reference value of the second delay counter CDLY2 is also 0, and an air-fuel ratio after the delay operation A/F-DLY2 when CDLY2>0 is considered to be rich (A/F-DLY2=1) and an air-fuel ratio after the delay operation A/FDLY2 when CDLY2≤0 is considered to be lean (A/FDLY2=1).

If the second delay counter CDLY2 is reversed, the control proceeds to step 1111 and it is determined whether or not the second delay counter CDLY2 is a negative value. If CDLY2<0, the control proceeds to steps 1112 and 1113 in which A/FDLY2←0, and

FAF2←FAF2+RS2.

That is, the air-fuel ratio after the delay operation A/F-DLY2 is changed from the rich side to the lean side, and the correction amount FAF2 is increased by adding a skip amount RS2. If CDLY2>0 at step 1111, the control proceeds to steps 1114 and 1115 in which A/FDLY2←1, and

FAF2←FAF2−RS2.

That is, the air-fuel ratio after the delay operation A/FDLY2 is changed from the lean side to the rich side, and the correction amount FAF2 is decreased by subtracting a skip amount RS2.

If the second delay counter CDLY2 is not reversed at step 1110, the control proceeds to step 1116 and it is determined whether or not the second delay counter CDLY2 is smaller than or equal to 0. If CDLY2≦0, which means the air-fuel ratio after the delay operation A/FDLY2 is lean, the control proceeds to step 1117 in which

FAF2←FAF2+KI2

That is, the correction amount FAF2 is increased by adding an integration amount KI2. If CDLY2>0, which means the air-fuel ratio after the delay operation A/FDLY2 is rich, the control proceeds to step 1118 in which

FAF2←FAF2−KI2.

That is, the correction amount FAF2 is decreased by subtracting an integration amount KI2.

Here, the integration amount KI2 is sufficiently smaller than the skip amount RS2, i.e., KI2<<RS2. Accordingly, an amount of fuel injection is gradually increased or decreased at step 1117 or 1118, though the amount of fuel injection is skippingly increased or decreased at step 1113 or 1115.

The calculated the correction amount FAF2 is stored in the RAM 105 and this routine is completed at step 1120.

In this way, the first air-fuel ratio correction amount FAF2 is calculated in accordance with the delay operated output of the downstream-side O$_2$ sensor 15 when the catalyst converter 12 is not deteriorated, although it is not calculated when the catalyst converter 12 is deteriorated.

As described above, the correction amounts FAF1 and FAF2 calculated during the feedback control can be stored in the back-up RAM 106 as other values such as FAF1' and FAF2', thereby improving a driveability at the re-starting of the engine.

Figure 12:
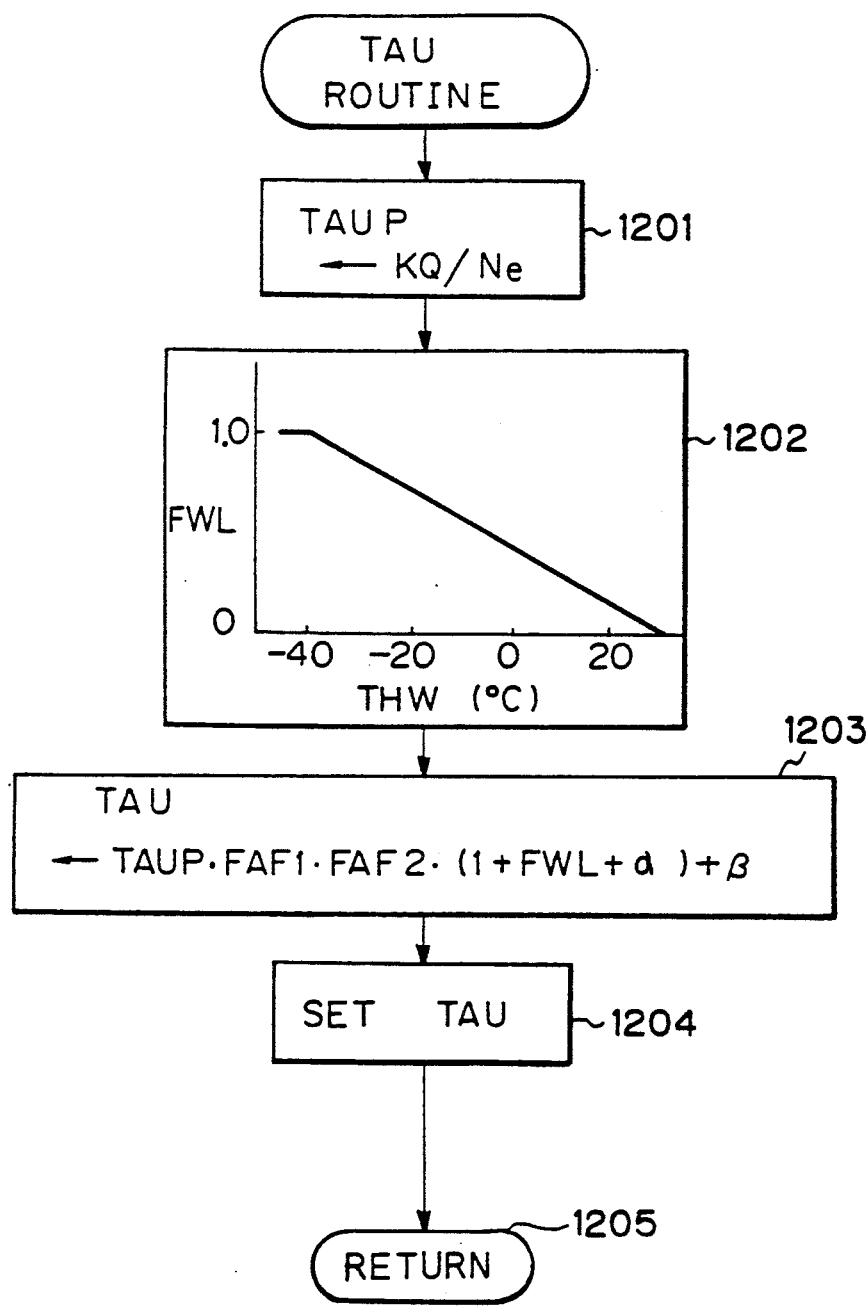

FIG. 12 is a routine for calculating a fuel injection amount TAU executed at a predetermined crank-angle, for example, 360° CA, when the engine is a center injection type, and at 180° CA when the engine having four cylinders is a separate injection type. At step 1201, a base fuel injection amount TAUP is calculated in accordance with the intake air amount data Q and the engine rotational speed data Ne read out from the RAM 105. That is, TAUP←KQ / Ne where K is a constant. Then at step 1202, a warming-up incremental amount FWL is calculated from a one-dimentional map by using the coolant temperature data THW stored in the RAM 105. Note that the warming-up incremental amount FWL decreases when the coolant temperature THW increases.

At step 1203, a final fuel injection amount TAU is calculated by

TAU←TAUP·FAF1·FAF2·(1+FWL+α)+β where α and β are correction factors determined by other parameters such as the voltage of the battery and the temperature of the intake air. AT step 1204, the final fuel injection amount TAU is set in the down counter 108, and in addition, the flip-flop 109 is set to initiate the activation of the fuel injection valve 7. Then this routine is completed by step 1205.

Note that, at step 1204, a fuel injection operation is carried out in accordance with the fuel injection amount TAU calculated at step 1203. In this operation, for example, the fuel injection amount TAU is preset in a down counter 108, and simultaneously, a flip-flop 109 is set to initiate the activation of the fuel injection valve 7, and thereafter, the flip-flop 109 is reset to stop the fuel injection by a carry-out signal output from the down counter 108 in accordance with the passage of a time equivalent to the time needed for the amount of fuel TAU to be injected.

Also, in the above-described embodiment, the deterioration of the catalyst converter is detected in accordance with the period of the output of the upstream-side O$_2$ sensor, it can be detected by using the amplitude of the air-fuel ratio correction amount. Further, the first air-fuel ratio feedback control by the upstream-side O$_2$ sensor 13 is carried out at relatively short intervals, such as 4 ms, and the second air-fuel ratio feedback control by the downstream-side O$_2$ sensor 15 is carried out at relatively long intervals, such as 1 s. This is because the upstream-side O$_2$ sensor 13 has good response characteristics when compared with the downstream-side O$_2$ sensor 15.

Further, the present invention can be applied to a double O$_2$ sensor system in which other air-fuel ratio feedback control constants, such as the delay time periods TDR1 and TDL1, the integration amount KI1, or the reference voltage V$_{R1}$, are variable.

Still further, a karman vortex sensor, a heat-wire type air flow sensor, and the like can be used instead of the airflow meter.

Although in the above-mentioned embodiments, a fuel injection amount is calculated on the basis of the intake air amount and the engine rotational speed, it can be also calculated on the basis of the intake air pressure and the engine rotational speed, or throttle opening and the engine rotational speed.

Further, the present invention can be also applied to a carburetor type internal combustion engine in which the air-fuel ratio is controlled by an electric air control valve (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 1201 of FIG. 12 is determined by the carburetor itself, i.e., the intake air negative pressure and the engine rotational speed, and the air amount corresponding to TAU at step 1203 of FIG. 12.

Further, a CO sensor, a lean-mixture sensor or the like can be also used instead of the O$_2$ sensor. Also, the control circuit 10 in FIG. 5 is constructed by the microcomputer, that is, the control circuit 10 is constructed by the digital circuit in the above-described embodiments, an analog circuit can be used to construct the control circuit 10.

We claim:

1. A method of detecting a deterioration of a catalyst converter for removing pollutants in the exhaust gas disposed within an exhaust gas passage of an internal combustion engine having upstream-side and downstream-side air-fuel ratio sensors disposed upstream and downstream, respectively, of said catalyst converter for detecting a concentration of a specific component in an exhaust gas, comprising the steps of:

adjusting an air-fuel ratio in accordance with the outputs of said upstream-side and downstream-side air-fuel ratio sensors;

detecting whether or not said catalyst converter is deteriorated in accordance with an output of said downstream-side air-fuel ratio sensor while the air-fuel ratio is adjusted by an air-fuel ratio correction amount;

detecting whether said upstream-side air-fuel ratio sensor is in a normal state or in an abnormal state in accordance with the output of said upstream-side air-fuel ratio sensor; and prohibiting the detection of the state of said catalyst converter when said upstream-side air-fuel ratio sensor is in an abnormal state.

2. A method as set forth in claim 1, wherein said upstream-side air-fuel ratio sensor state detecting step comprises the steps of:

calculating a time of the output of said upstream-side air-fuel ratio sensor;

comparing said calculated time with a predetermined time; and determining that said upstream-side air-fuel ratio sensor is in an abnormal state when said calculated time is longer than the predetermined time.

3. A method as set forth in claim 1, wherein said upstream-side air-fuel ratio sensor state detecting step comprises the steps of:

calculating said air-fuel ratio correction amount in accordance with the output of said upstream-side air-fuel ratio sensor;

calculating an amplitude of said air-fuel ratio correction amount;

comparing the calculated amplitude of said air-fuel ratio correction amount with a predetermined value; and determining that said upstream-side air-fuel ratio sensor is in an abnormal state when the calculated amplitude of said air-fuel ratio correction amount is larger than said predetermined value.

4. A method as set forth in claim 1, wherein the deterioration of said catalyst converter detecting step comprises steps of:

calculating an amplitude of the output of said downstream-side air-fuel ratio sensor;

comparing said calculated amplitude with a predetermined value; and determining that said catalyst converter is deteriorated when said calculated amplitude is larger than the predetermined value.

5. A method as set forth in claim 1, wherein the deterioration of said catalyst converter detecting step comprises the steps of:

calculating a time of the output of said downstream-side air-fuel ratio sensor;

comparing said calculated time with a predetermined time; and determining that said catalyst converter is deteriorated when said calculated time is longer than the predetermined time.

6. A method as set forth in claim 1, wherein the deterioration of said catalyst converter detecting step comprises the steps of:

calculating a time of the output of said upstream-side air-fuel ratio sensor;

calculating a time of the output of said downstream-side air-fuel ratio sensor;

calculating a ratio of said calculated time of the output of said upstream-side air-fuel ratio sensor to said calculated time of the output of said downstream-side air-fuel ratio sensor;

comparing said calculated ratio with a predetermined value; and determining that said catalyst converter is deteriorated when said calculated ratio is larger than the predetermined value.

7. An apparatus for detecting a deterioration of a catalyst converter for removing pollutants in the exhaust gas disposed within an exhaust gas passage of an internal combustion engine having upstream-side and downstream-side air-fuel ratio sensors disposed upstream and downstream, respectively, of said catalyst converter for detecting a concentration of a specific component in an exhaust gas, comprising:

means for adjusting an air-fuel ratio in accordance with the outputs of said upstream-side and downstream-side air-fuel ratio sensors;

means for detecting whether or not said catalyst converter is deteriorated in accordance with an output of said downstream-side air-fuel ratio sensor while the air-fuel ratio is adjusted by an air-fuel ratio correction amount;

means for detecting whether said upstream-side air-fuel ratio sensor is in a normal state or in an abnormal state in accordance with the output of said upstream-side air-fuel ratio sensor; and means for prohibiting the detection of the state of said catalyst converter when said upstream-side air-fuel ratio sensor is in an abnormal state.

8. An apparatus as set forth in claim 7, wherein said upstream-side air-fuel ratio sensor state detecting means comprises:

means for calculating a time of the output of said upstream-side air-fuel ratio sensor;

means for comparing said calculated time with a predetermined time; and means for determining that said upstream-side air-fuel ratio sensor is in an abnormal state when said calculated time is longer than the predetermined time.

9. An apparatus as set forth in claim 7, wherein said upstream-side air-fuel ratio sensor state detecting means comprises:

means for calculating said air-fuel ratio correction amount in accordance with the output of said upstream-side air-fuel ratio sensor;

means for calculating an amplitude of said air-fuel ratio correction amount;

means for comparing the calculated amplitude of said air-fuel ratio correction amount with a predetermined value; and means for determining that said upstream-side air-fuel ratio sensor is in an abnormal state when the calculated amplitude of said air-fuel ratio correction amount is larger than said predetermined time.

10. An apparatus as set forth in claim 7, wherein said catalyst converter deterioration detecting means comprises:

means for calculating an amplitude of the output of said downstream-side air-fuel ratio sensor;

means for comparing said calculated amplitude with a predetermined value; and means for determining that said catalyst converter is deteriorated when said calculated amplitude is larger than the predetermined value.

11. An apparatus as set forth in claim 7, wherein said catalyst converter deterioration detecting means comprises:

means for calculating a time of the output of said downstream-side air-fuel ratio sensor;

means for comparing said calculated time with a predetermined time; and means for determining that said catalyst converter is deteriorated when said calculated time is longer than the predetermined time.

12. An apparatus as set forth in claim 7, wherein said catalyst converter deterioration detecting means comprises:

means for calculating a time of the output of said upstream-side air-fuel ratio sensor;

means for calculating a time of the output of said downstream-side air-fuel ratio sensor;

means for calculating a ratio of said calculated time of the output of said upstream-side air-fuel ratio sensor to said calculated time of the output of said downstream-side air-fuel ratio sensor;

means for comparing said calculated ratio with a predetermined value; and means for determining that said catalyst converter is deteriorated when said calculated ratio is larger than the predetermined value.

* * * * *